United States Patent

[11] 3,543,947

| [72] | Inventor | George C. Devol |
| | | 990 Ridgefield Road, Wilton, Connecticut 06897 |
| [21] | Appl. No. | 748,702 |
| [22] | Filed | July 30, 1968 |
| [45] | Patented | Dec. 1, 1970 |

[54] CONSTANT-AIM WORK HEAD
24 Claims, 8 Drawing Figs.

[52] U.S. Cl. .................................................. 214/1, 214/147
[51] Int. Cl. ..................................................... B66c 1/44
[50] Field of Search .......................................... 214/1(B), 1(B3), 1(B4), 1(RCM), 147(T)

[56] References Cited
UNITED STATES PATENTS

| 3,051,328 | 8/1962 | Brown | 214/1(B3) |
| 3,255,893 | 6/1966 | Hainer | 214/1(RCM) |
| 3,306,471 | 2/1967 | Devol | 214/1(B) |

*Primary Examiner*—Gerald M. Forlenza
*Assistant Examiner*—George F. Abraham
*Attorney*—Paul S. Martin ABSTRACT: A work head carried by a pivoted arm has a pivotal axis that is parallel to the pivotal axis of the arm. In one mode, the work head is operable about its own axis independent of the angular motions of the arm, and the work head is also operable in a parallel-motion mode so as to maintain a constant attitude in space despite the angular motions of the arm that carries the work head. The arm and the work head each has its own actuator and its own control means and each is separately responsive to its own channels of control input for independent motions. The control means of the work-head actuator also responds inversely, either directly or indirectly, to the channel of control input for the control means of the arm when the parallel-motion mode is in effect. Both manual and program-control means are provided, both for the control means of the actuators and for selecting the mode of operation of the work head, whether independent or parallel-motion mode.

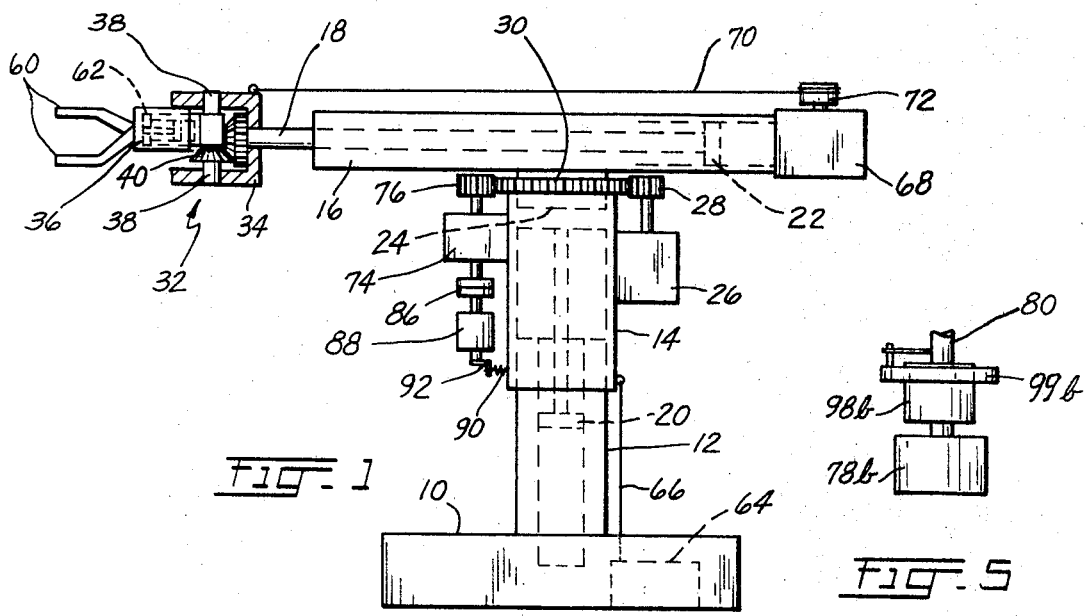
Fig. 1
Fig. 5
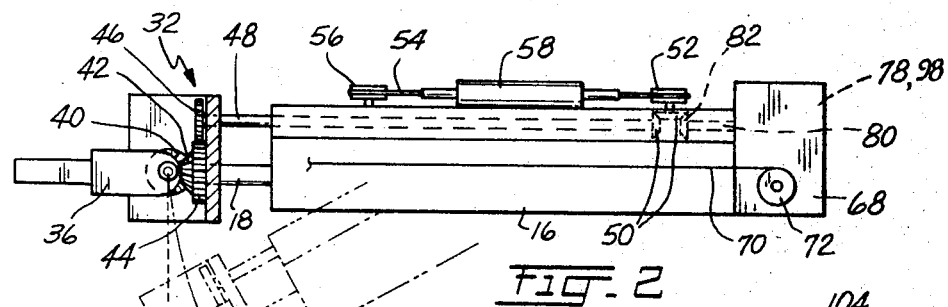
Fig. 2
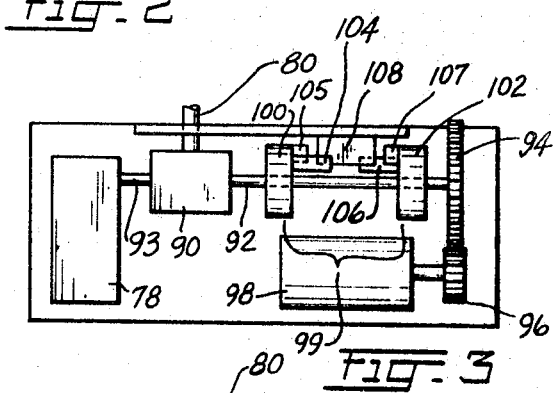
Fig. 3
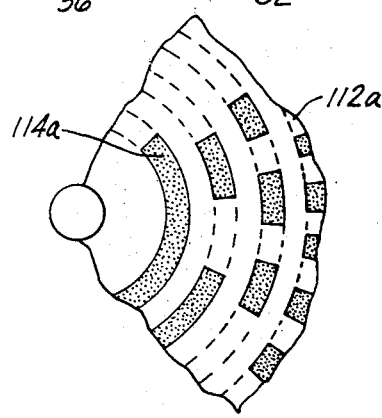
Fig. 4A
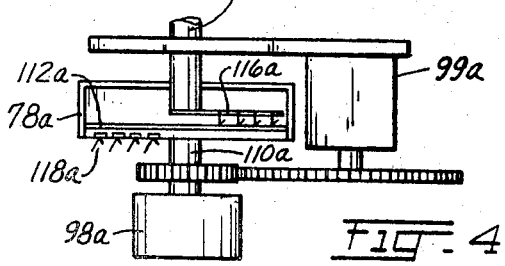
Fig. 4

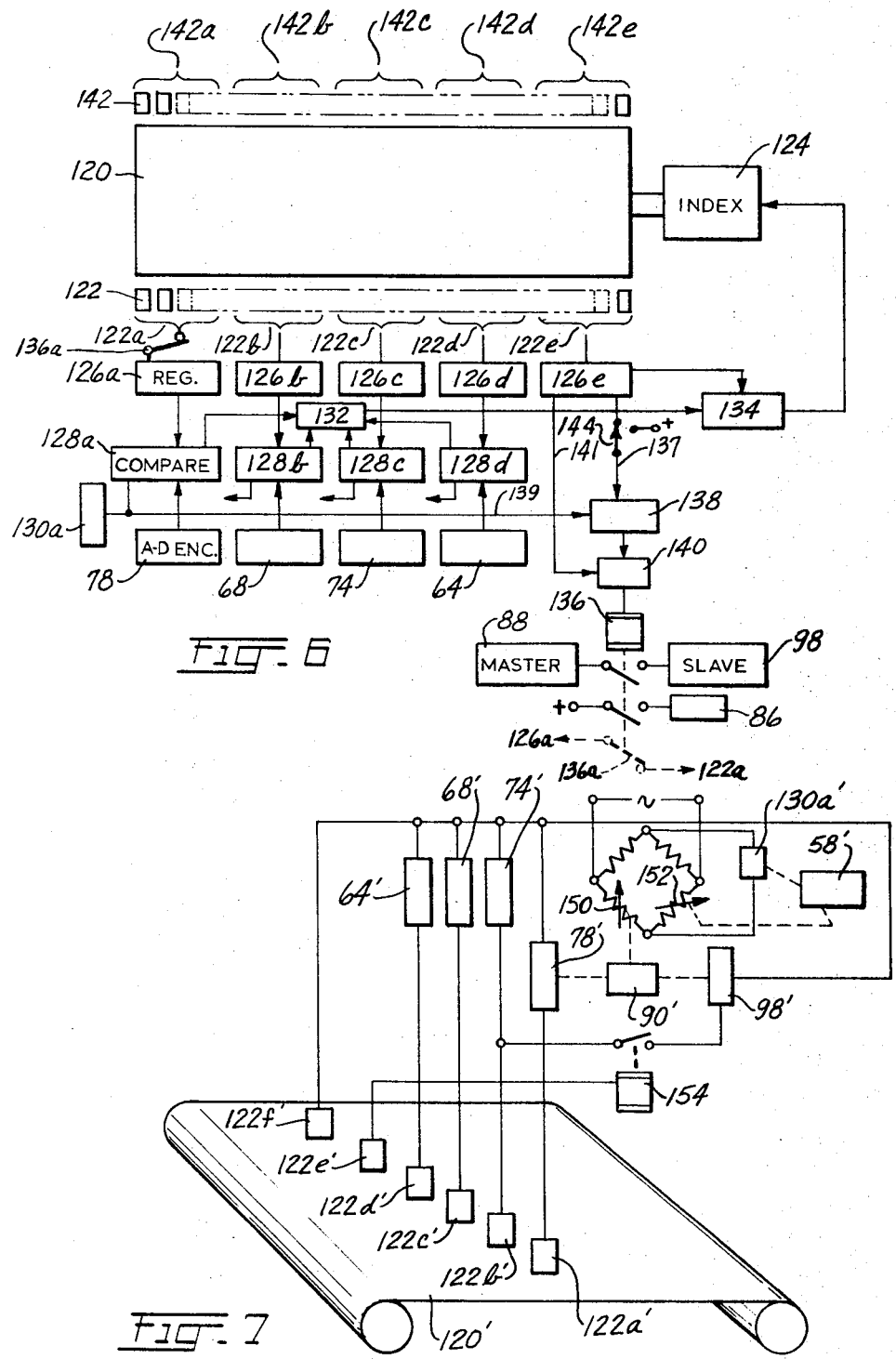

3,543,947

CONSTANT-AIM WORK HEAD

This invention relates to apparatus having a work head and means for operating the work head in several degrees of freedom. The work head in an apparatus of particular importance has an article gripper, operable to transfer articles to and from many places, as in pallet loading or unloading. Otherwise the work head may have a drill that is operated by the apparatus to make a series of holes, or it may have welding jaws to make a series of spot welds, or it may have a paint spray gun, and it is adaptable to many other applications. In its immediate application as presently conceived, the invention is related to program-controlled article-transfer apparatus, and it is described below primarily in that context, but there are broader implications.

A known basic form of apparatus for carrying a work head has a boom or an arm that swings about a pivot. The pivotal axis is vertical in the illustrative embodiment described in detail below. The attitude of the work head is normally controlled so that it can be aimed as desired.

An important object of the invention resides in providing an automatic control for operating a work head so as to maintain the aim of the work head constant in one direction despite the angular motions of its supporting arm. A further object of the invention resides in providing program controlled apparatus having normally independent program controls for determining the various motions of which the apparatus is capable and including a parallel-motion mode of control for the work head so as to maintain its aim constant despite swinging motions of its supporting arm. A closely related object resides in providing program-controlled apparatus wherein a work head carried by a swinging arm is ordinarily subject to program control, but where the work head control is altered automatically under program control to introduce the parallel-motion mode of operation and it is altered again to restore the work head to program control with the same relationship between the control program and the work head as that existing before the parallel-mode operations.

The illustrative apparatus described in detail below represents an exemplary but simplified embodiment of the invention in its various aspects. A more elaborate form of such apparatus to which the invention applies is shown and described in an application filed concurrently herewith by myself jointly with Paul S. Martin, application Ser. No. 748,703. The present apparatus has a pedestal supporting a telescopic post that carries an arm capable of swinging in horizontal arcs about the vertical axis of the post. The arm carries a work head. The arm is telescopic, and thus it can extend and retract the work head. The aim of the work head, and the length and angular position of the arm, and the height at which the arm is supported are normally independently controlled motions. Each motion represents a separate degree of freedom. In known apparatus, the separate motions can be executed automatically, with each degree of freedom operating under program control. The apparatus can also be operated under manual control, and it is actually operated manually (under manual control) in a preliminary pattern of motions in order to record or otherwise establish the program and thus "teach" the apparatus (including its control program) to carry out the desired pattern of motions. Apparatus of this type is shown in my U.S. Pat. Nos. 2,988,237 issued June 13, 1961, 3,279,624 issued Oct. 18, 1966, and 3,306,471 issued Feb. 28, 1967.

Despite the relative ease of creating new control programs in such apparatus, it is somewhat time consuming to establish a program for controlling each of the primary motions and each of the secondary motions. Such a condition arises where there are many locations to be served by the work head, as in loading or unloading pallets with articles arranged in rows, tiers and layers. In achieving the objects of the invention, the angular displacements executed by the arm are matched automatically, without resort to separate motion-control program data, by equal and opposite angular displacements of the work head, in the "parallel-motion" mode of operation of the apparatus described below specifically. In this illustrative apparatus, the work head has a power actuator that is normally program-controlled. The power actuator of the work head is here controlled by a servo receiver that introduces an offset from its initial relationship to the supporting arm, a servotransmitter provides a continuing signal representing the angular motions of the arm during the parallel-motion mode of operations. The servotransmitter and the servoreceiver are coupled so that the starting control of the work head actuator is supplemented by control that moves the work head through angles that are equal and opposite to the program-controlled angular motions of the arm. This avoids the need for creating a separate program for the aim of the work head. At the end of this parallel-motion mode of operation, involving perhaps a lengthy sequence of motions, the servotransmitter and the servoreceiver are restored to zero, and program control of the work head is resumed.

The nature of the invention, including the foregoing and other objects, features and advantages, will be better understood from a review of the following detailed description of the illustrative embodiment which is shown in the accompanying drawings that form part of the disclosure of this embodiment.

In the drawings:

FIG. 1 is a lateral elevation, partly in cross section, of an illustrative embodiment of the invention;

FIG. 2 is a top plan view of the embodiment of FIG. 1, portions being shown in cross section and portions being broken away for clarity, the left-hand end of the apparatus being shown in broken lines and in dotted lines, respectively, to represent changed positions of the apparatus;

FIG. 3 is a lateral elevation of a portion of the apparatus of FIGS. 1 and 2, drawn to a larger scale;

FIG. 4 is a side elevation of a modification of the apparatus in FIG. 3;

FIG. 4A is an enlarged detail of a component of the apparatus of FIG. 4;

FIG. 5 is a side elevation of a still further modification of the apparatus of FIG. 3;

FIG. 6 is a block diagram of program-control apparatus for controlling the operation of the apparatus in FIGS. 1—3; and FIG. 7 is a block diagram of a modified form of control apparatus, as alternative to the control apparatus of FIG. 6.

FIGS. 1—3, inclusive, represent a simplified showing of one form of apparatus suitable for program-controlled transfer of articles through various potentially complex paths. The apparatus includes a base 10 having vertical telescopic portions 12 and 14 of a post for supporting an arm that includes main portion 16 and extendible portion 18. Hydraulic actuator 20 in the vertical post operates under suitable control to raise and lower the top portion 14 of the support post, while a similar hydraulic actuator 22 in arm portion 16 is effective to extend and retract arm portion 18. Arm portion 16 is supported in bearing 24 for rotation about a vertical axis. Motor 26 acts through gears 28 and 30 to drive 16 about a vertical axis through the center of bearing 24 and gear 30.

Portion 18 of the arm carries a head unit generally designated 32 including frame 34 that carries work head 36 on top and bottom pivots 38 whose axis is parallel to that of bearing 24. A bevel gear 40 is fixed to work head 36 and to pivots 38. Bevel gear 42 that meshes with gear 40 is secured to gear 44, and the latter is rotated and held in any desired position by pinion 46. Shaft 48 drives pinion 46, and this shaft telescopes in a shaft in arm portion 16 for providing drive from bevel gears 50 that are operated by a sprocket 52. Chain 54 extends about sprocket 52 and another sprocket 56. The ends of this chain being connected to rod ends of a reciprocating hydraulic actuator 58. Operation of actuator 58 to the left and the right in FIG. 2 causes rotation of sprocket 52, bevel gears 50, shaft 48, gears 46 and 44, and bevel gears 42 and 40, thereby swinging work head 36 about its vertical axis through pivot shafts 38.

Work head 36 includes a pair of jaws 60 that are operable by suitable means in head 36 (e.g., as in U.S. Pat. No. 3,306,471) to grip and release articles. Jaws 60 are operable horizontally by actuator 62 through a short stroke relative to frame 34 along a line perpendicular to the axis of pivots 38. Thus the jaws can be projected for a short distance and retracted, as may be required from time to time.

In its preferred form, the apparatus of FIGS. 1 and 2 is operable automatically under control of digital information supplied by program-controlled apparatus such as that shown generally in FIG. 6 and described in detail below. As part of the control apparatus, a number of digital shaft-position encoders or analog-to-digital converters (often called A–D encoders) are included in FIGS. 1—3. Encoder 64 in base 10 is connected by a cable 66 to the movable post portion 14. The digital codes developed by A–D encoder 64 represent the various elevations to which head unit 32 can be moved. A–D encoder 68 is connected by cable 70 to work head 36. The values represented by the codes of A–D converter 68 identify the radial position of head unit 32, this being the distance between the axes of pivots 38 and bearing 24. Drum 72 is internally tensioned so as to wind cable 70, and to operate encoder 68. A–D encoder 74 is coupled to arm 16, 18 by suitable gearing, including gear 76 and gear 30. Encoder 74 provides a digital representation of the angular position of arm 16, 18 about its vertical axis. Another encoder 78 is connected by means including shaft 80 and bevel gear 82 to the angular drive of head 36. A–D converter 78 provides a digital representation of the angular position of work head 36 about its pivotal axis 38, in relation to arm 16. While a further encoder may be provided for representing the in-and-out position of jaws 60 in relation to pivots 38, actuator 62 advantageously is a fixed-stroke device for advancing a tool (replacing jaws 60) to a limit.

Each of the motions of the article-transfer apparatus of FIG. 1 that is produced by actuators 20, 22, 26 and 58 represents a motion in a separate degree of freedom. These motions are ordinarily subject to individual control. In various patents mentioned above, and in connection with the apparatus in FIG. 6 described below, it is known that the apparatus can be caused to operate under manual control in a "teach" sequence of motions and in each critical position, the coordinates in each degree of freedom can be recorded. While this "teaching" procedure of establishing a control program represents a considerable advantage over other ways of developing control programs, the present invention provides an important simplification in the generation of a control program. One requirement that arises often is for the attitude, or aim, or direction of work head 36 and jaws 60 to remain constant even though arm 16 swings about its vertical axis through bearing 24. Thus work head 36 may be carried from its position shown in solid lines in FIG. 2 to that represented in broken lines, and head unit 32 may concurrently be projected so that work head 36 assumes the dotted line position represented in FIG. 2. Work head 36 remains parallel to its initial position shown in solid lines. Arm 16, 18 swings about the vertical axis, and this would incidentally cause work head 36 to swing through the same angle, thus assuming a changed attitude or direction in space. In the usual "teaching" mode, work head 36 would be operated under manual control to swing through a reverse angle in order to maintain the initial attitude of the work head. In the operation considered, arm 16 carries head unit 32 through an angular motion while, at the same time, it is required that work head 36 should remain in a position parallel to its initial position.

The following provision is made for simplifying the recording of programs involving what may be called a "parallel-motion mode of operation" and for improving the operation of the apparatus when the parallel-motion mode is in effect. This "parallel-motion" mode of operation involves automatic maintenance of parallelism between the various positions of head 36 while arm 16, 18 swings through an angle.

An electrically controlled clutch 86 (FIG. 1), for example a magnetic clutch, couples the shaft of encoder 74 to the master control 88 of a servo system. Ordinarily, clutch 86 is deenergized and servomaster 88 is maintained in a "zero" position by a tension spring 90 connected to a crank 92 on the operating shaft of servomaster 88. The servoslave unit and related apparatus is seen in FIG. 3. A–D converter 78, which represents the angular position of work head 36 in relation to arm 16, 18, is coupled to gear 82 and shaft 80 by a differential gearing unit or simply a "differential" 90. The third shaft 92 of differential 90 is coupled by gear 94 and pinion 96 to a servoslave unit 98. Advantageously servomaster 88 and servoslave 98 may be a synchrotorque transmitter and a synchrotorque receiver, respectively. A torsion spring unit 99 biases servotorque receiver 98 to its zero or home position in such a manner that the servotorque receiver can operate in either direction away from "home". Spring unit 99 includes a pair of leaf-spring torsion units 100 and 102 whose cases are fixed on shaft 92. Within these cases, there are helically wound leaf springs. The outer end of each spring is fixed to a respective arm 104 and 106, while the inner ends of those leaf springs are fixed to shaft 92. Arms 104 and 106 are disposed at opposite faces of a fixed stop 108. Arms 105 and 107 on the cases of units 100 and 102 are alined with stop 108. The torsion spring units are thus effective to bias shaft 92 and servoslave unit 98 accurately to their "zero" or "home" positions, a position that is assumed when the servoreceiver is deenergized. Rotation of shaft 92 in either direction forces the spring cases to rotate the arms 105, 107 on the cases, forcing one of the spring arms 104, 106 away from stop 108. The other arm 104 or 106 thereafter acts to bias shaft 92 toward "home". Shaft 92 is limited to a little less than 360° of rotation, but this will suffice because of suitable gearing between the spring unit 99 and the remainder of the apparatus in FIG. 3. If more than one rotation were required for the arcuate range of work head 36 then spring unit 99 could have its own shaft, geared down from shaft 92.

The operation of the parallel-motion mode control means thus far described may be summarized at this point. It may be assumed that the apparatus has been programed to the position represented by the solid lines in FIG. 2. Each of the degrees of freedom presumably has been programed to reach this position. In order to reach the position represented by the dotted lines in FIG. 2, work head 36 is carried to its new position under control of a post-rotation coordinate and an arm-extension coordinate, by swinging arm 16, 18 to the broken-line position and moving work head 36 to the more extended position represented in dotted lines. The attitude of work head 36 has not changed. When the parallel-motion mode of operation is in effect, it is unnecessary to record a new coordinate in the program for establishing this attitude of work head 36. Both during program recording and operation, clutch 86 is energized. Thereafter, as arm 16 is moved from its solid-line position to its broken-line position under control of its A–D encoder and the coordinates are recorded in the program, servotransmitter 88 sends a signal to operate servoslave unit 98 through an equal and opposite angle. In this operation, differential 90 does not rotate the shaft 93 connected to A–D encoder 78.

Servoreceiver 98 introduces what may be called an "offset" between the position represented by the A–D encoder 78 and the position assumed by work head 36. This offset is exactly equal and opposite to the angle through which arm 16, 18 has moved. So long as clutch 86 remains energized, and the digital input information that is compared to the code of A–D converter 78 does not change, any number of angular motions of arm 16, 18 can be carried out and work head 36 will automatically remain parallel to its original position.

At some time in a complete sequence of motions, the parallel-motion mode of operating work head 36 may no longer be of any interest. Thereafter each new position of the apparatus may require a distinctive arbitrarily established attitude or aim of work head 36, not parallel to its previous position. The initial absolute relationship between the position of work head 36 relative to arm 16, 18 and its encoder 78 then has to be reestablished. This is accomplished simply by deenergizing clutch 86 and deenergizing or disconnecting servotransmitter 88 and servoreceiver 98. Spring 90 immediately restores servotransmitter 88 to its "zero" position, and spring mechanism 99 restores servoreceiver 98 and shaft 92 to their "zero" position.

FIGS. 4 and 4A illustrate an alternative to the apparatus in FIG. 3 that may be used with servotransmitter 88 in the parallel-motion mode of operation of the apparatus in FIG. 1. In FIG. 4, shaft 80 is connected to or forms the input shaft of A-D encoder 78a. The frame structure of housing of A-D encoder 78a—connected by shaft 110a to the shaft of servoreceiver 98a whose housing is fixed. Spring reset or zeroing means 99a (like that in FIG. 3) is geared to shaft 110a. A-D converters or encoders commonly incorporate several code wheels, a portion of a typical wheel being illustrated in FIG. 4A. Code wheel 112a has a number of concentric tracks of alternate conducting portions 114a separated by insulating portions. A contact arm 116a sweeps around these tracks and, depending on the particular angular position of arm 116 in relation to code wheel 112a, a distinctive unique digital value is sensed by the contacts on arm 116a. Of course, this is only one type of A-D encoder, but generally encoders have a circuit connection for each track of code elements. In the apparatus of FIG. 4, slip rings and contacts 118a are provided for making connection to the several code tracks in the rotatably supported encoder housing on shaft 110a.

In producing the parallel-motion mode of operation, encoder 78a and offset servoreceiver 98a operate almost the same as the apparatus of FIG. 3, so that no detailed description of the apparatus of FIG. 4 is given here. The apparatus of FIG. 4 omits differential 90 and thereby avoids the expense of such a differential, and it also avoids slight inaccuracies that may be introduced by such a differential. On the other hand, the brushes and slip rings 118a represent a potential source of trouble, so that the apparatus of FIG. 3 may be preferred from the point of view of reliability.

In the embodiment of FIG. 4, the A-D encoder is interposed between servoreceiver 98a and shaft 80. A reversal of this is shown in FIG. 5, in which shaft 80 is connected to the rotor of servoreceiver 98b, while the frame of the servoreceiver is connected to the control shaft of A-D encoder 78b whose housing is fixed. Normally (when the parallel-motion mode of operation is not in effect) the spring mechanism 99b maintains a "zero" relationship between the rotor and the stator of the servoreceiver 98b. This means that this spring mechanism must be firm enough to provide a drive coupling from drum 80 to A-D converter 78b in both directions of rotation, to enforce or produce reversals in the direction of rotation, as they occur. Connections to the servoreceiver 98b are provided by slip rings (not shown) like slip rings 118a.

FIG. 6 shows in block form a suitable program control for the apparatus of FIGS. 1 and 2 in which any one of the control assemblies in FIGS. 3, 4 or 5 is incorporated. This program control apparatus includes a drum 120 having a cylindrical surface layer of high-retentivity ferromagnetic material. A series of magnetic pickup heads 122 are shown opposite drum 120. Each pickup head 122 scans what may be called a track when the drum is indexed or rotated; and all of the pickup heads 122 are simultaneously opposite what may be called a slot when any of the heads is in sensing relation to a control area of the drum. An indexing drive 124 operates the drum to advance successive slots into sensing position opposite sensing elements 122. The indexing mechanism is a stepwise advancing drive unit in case the drum is stepped from one slot to the next and is arrested, in which case sensing heads 122 are the "at-rest" type of sensing heads. In the case of a continuously rotating memory drum, drive 124 is a high-speed continuous drive motor and the sensing heads are equipped with an appropriate gating circuit for selecting the particular slot that is to be sensed. A variety of other program control media may also be used to provide suitable control information for the apparatus of FIG. 1, such as a static memory matrix and selective sequencing switch means.

Sensing heads 122 are divided into five groups, 122a, b, c, d and e. Three groups 12b, c, and d provide digital combination codes for controlling what may be called the primary motions of the apparatus, namely the longitudinal, the pivotal motion, and the elevation operation of arm 16, 18. Another group of pickup heads 122a provides digital combination codes for determining what may be called a secondary motion, the successive angular positions or attitudes of work head 36. Each group of pickup heads 122a, b, c, and d senses plural tracks on drum 120. The group of tracks sensed by any one of these groups of pickup heads constitutes an individual channel of control information. Thus, in this illustrative apparatus, drum 120 provides four individual channels of control information for controlling the three primary motions and one secondary motion of the apparatus, respectively. There are a number of other channels of control information for other purposes among the tracks sensed by pickup heads 120e; and in that part of the apparatus any one channel of control information may comprise only one track, or it may comprise plural tracks as in the case of the four motion-controlling channels of control information. The fifth group of pickup heads 122e provides for miscellaneous control functions, as for enabling the apparatus of FIGS. 1—3 to be coordinated with external equipment, and for effecting a rapid-index operation of drum 120 between the end slot of a program and the beginning of that program. A variety of other special functions are controlled or initiated by heads 122e, one of which is discussed below. A series of temporary storage registers 126a, b, c, d and e retain the codes and other information sensed by the various pickup heads 122. A-D encoders 78, 68, 74 and 64 provide digital code input to comparing units 128a, 128b, 128c, and 128d. Where the A-D encoders provide a gray code as is common in this type of apparatus, a code converter may be interposed to provide the comparing units with conventional binary digital codes. The output of comparing unit 128a operates a suitable control device 130a to determine the aim of head 36. For example, control device 130a is a double-acting hydraulic servovalve where actuator 58 is a reciprocating hydraulic actuator. Comparison devices 128b, 128c and 128d provide control output for control devices such as hydraulic valves, for controlling actuators 22, 26 and 20, respectively. Each actuator 20, 26, 22 and 58 comes to rest when its comparison device 128 establishes an identity between the related storage register and A—D encoder. A coincidence circuit 132 provides output to a control unit 134, that controls indexing drive 124 for advancing the sensing to the next slot on the drum. It is understood, of course, that this advance may be subject to inhibiting control by a portion of storage register 126e in case there is to be a timed delay or a coordinated delay before the next program step, to coordinate external equipment with the apparatus of FIGS. 1 and 2.

A suitable portion of register 126e, under control of related sensing heads 122, is arranged to control the energization of relay 136, when the parallel-motion mode of operation is to be in effect. When relay 136 is energized, the servomaster 88 is connected to the servoslave 98, and clutch 86 is energized. This takes place under control of "and" gate 138 which becomes effective to transmit a "parallel-mode" control signal from drum 120 via register 126e to relay 136 along line 137, but this occurs only when work head 36 is in a desired initial attitude as evidenced by a signal on line 139 showing a "match" condition of comparison unit 128a. Line 139 acts through gate 138 to trigger parallel-mode register 140 which is, for example, a bistable circuit. Relay 136 opens contacts 136a for preserving in register 126a the initial value that determines the initial aim of head 36. Register 140 maintains relay 136 energized thereafter, until a reset signal from one of the pickup heads 122e is transmitted via register 126e and line 141 to register 140. The relay then deenergizes or disconnects the servoslave and the master, and releases clutch 86, and conditions register 126a to enter the next sensed value from the drum.

In recording a given program, the control devices 130 of actuators 20, 22, 26 and 58 are operated manually for establishing a set of coordinates for each position to be assumed by work head 36. The A–D encoders are used to sense the positions reached by the different motions of the apparatus when operated under manual control. By means of usual switching means (not shown) the codes for each position of the apparatus are recorded on drum 120 by corresponding recording heads 142a—d. (The sensing and recording heads 122 and 142 are diagrammatically represented as being separate units, but they are common units with separate coils in a commercial apparatus.) Then the manual controls are operated to advance the apparatus to the next desired position.

The three controls for the elevation, angle and radial extent of arm 16, 18 are required for each of the successive significant positions of work head 36, but it is unnecessary to establish any more than the starting attitude or angular position of work head 36 in case there are to be several operations in which the attitude of work head 36 is to remain fixed, i.e., for the parallel-motion mode of operation of the apparatus. Only the initial digital code is needed for the entire sequence of operations of work head 36 in the parallel-motion mode. During program recording, when the parallel-motion mode is to be brought into effect for a series of steps in the program, heads 122a and A–D encoder 78 are switched to their "operate" mode. Heads 122a are in sensing condition, so that the code representing the aim of work head 36 is entered into register 126a. The appropriate control recordings by heads 142e are made for starting the parallel-notion mode of operation, to remain in effect through the ensuing sequence of operations. Relay 136 is then energized by turning switch 144 to the direct-current supply shown. In each of the succeeding positions of the apparatus in the parralel-motion mode of operation, the appropriate codes are recorded by groups of recording heads 142b, 142c and 142d. Work head 36 maintains its initial aim or direction both during the "teaching" operations and during the subsequent automatic operation of the apparatus. Thus, the effort of adjusting the aim of head 36 and of recording its direction at each position is avoided. Head 36 moves through a sequence of parallel-aim positions.

The parallel-motion mode of operation is useful in a variety of circumstances as, for example, where a succession of articles is to be picked up from a first position and successive ones of these articles are to be deposited at successive locations along a straight line, parallel to each other. In another application, jaws 60 may be welding jaws, that are to be programed for making a series of resistance welds along a straight line. Still further, jaws 60 may be replaced by a tool such as a drill and head 36 may be moved to successive positions for drilling a series of parallel holes, utilizing actuator 62 to advance the drill into the work piece in each of the programed positions of the work head. Still further applications of the parallel-motion mode of operation are discussed in the above mentioned application filed concurrently herewith.

The described apparatus involves A–D encoders 64, 68, 74 and 78, in apparatus that operates work head 36 through a series of positions identified by absolute coordinates. This type of apparatus has certain unique features and represents the preferred embodiment of the invention. A variety of other types of apparatus adapted to program control are well known as, for example, where the motions from each point to the next in sequence are determined by a series of increments rather than absolute coordinates, and still others are known. In each such system, the parallel-motion mode of operation can be readily utilized, to advantage, in either of two broadly similar ways. In the form represented by the apparatus in FIG. 1, the control information that determines the angular motion of arm 16, 18 is supplied by the program drum and is utilized by the control means of actuator 26, this control means including A–D encoder 74. The same control information used to change the direction of arm 16, 18 is indirectly utilized in changing the angular position of work head 36 in relation to arm 16, 18. Thus, servotransmitter 88 monitors the angular positions of arm 16, 18 and is utilized to operate servoreceiver 98 for changing the aim of the work head in relation to arm 16, 18 reversely in accordance with the program-controlled changes in the direction of arm 16, 18.

FIG. 7 illustrates another known form of program control for apparatus such as that in FIGS. 1 and 2, and it illustrates direct control over the direction of the arm and the work head by program control means to effect angular motions of the work head 36 that are equal and opposite to the angular motions of the arm 16, 18. This represents direct control of the work head 36 by the program that controls arm 16, 18 rather than the indirect control of the angular motion of work head 36 in the embodiment of FIGS. 1—6. In FIG. 7, a magnetic tape 120' is advanced continuously by conventional drive means. A series of sine wave recordings is made in a preliminary teaching procedure under each of the sensing heads 122a', b', c', d', and f. In this diagram, each of the sensing heads is assumed to include an appropriate amplifier. The recorded sine wave under pickup head 122f is a reference signal applied to phase sensitive motors (e.g., two-phase motors or synchroreceivers), 64', 68', 74', 78' and 98'. The angular position of each of these motors is determined by the relationship between the sine wave sensed by its related sensing head 122a', b', c', and d'. The sine wave recordings sensed by pickup heads 122a', b', c' and d' constituted four individual channels of control information. In case the phase relationship between the reference wave and the control wave should remain constant, then the particular motor does not rotate, but it does rotate in one direction or the opposite as the phase of the control wave changes in relation to the reference wave.

Motor 78' operates what may be called a servomaster resistor 150 via differential 90'. Hydraulic actuator 58' operates work head 36 and coordinately operates a slave resistor 152. Resistors 150 and 152 are part of an alternating current bridge that controls valve 130a' so as to operate actuator 58' in either direction as may be required to restore balance of the bridge. Operation of actuator 58' moves work head 36 about its pivots 38. A similar bridge, not shown, enables motor 74' to control actuator 26 for rotating arm 16, 18 about the vertical axis of bearing 24. Another motor 98' has a shaft coupling to differential 90'. Motors 78' and 74' operate independently of each other under control of respective control recordings sensed by heads 122a' and 122b', respectively. During that time, motor 98' does not rotate, either as a result of a geared-down coupling in the motor to the differential shaft that inherently resists drive of the motor by the differential, or because of a suitably controlled brake (not shown), or otherwise.

When arm 16, 18 and work head 36 are to operate according to the parallel-motion mode, motor 78' does not rotate because of an applied brake or internal worm gearing, or because the wave sensed by head 122a' maintains a constant relationship to the wave under head 122f. Also, a control signal sensed by head 122e' energizes and maintains energization of relay 154, This causes motor 98' to be operated concurrently with motor 74'. Accordingly, actuator 26 under control of its self-balancing bridge controlled by motor 74' operates arm 16 through a program controlled series of angular motions coordinated with equal and opposite program controlled elevation and arm-extension motions of the apparatus, and the same signal for motor 74' operates motor 98' and effects equal and opposite angular operation of work head 36 in the parallel-motion mode. When the parallel-motion mode is to be discontinued, the wave sensed by sensing head 122e' ceases, and work head 36 is restored to independent operation under control of its separate program signal from sensing element 122a'. The parallel-motion mode of operation is carried out here (as in the control system of FIG. 6) without resort to separately recording an angular-motion control signal for the work head. As a further alternative, motor 98' could be omitted and motor 78' could be switched to control by the same sensing head 122b' as that which controls motor 74' when the parallel-motion mode is needed. It is understood that a partial rotation of a control motor in FIG. 7 and variants, such as that which may occur when the change is effected into and out of the parallel-motion mode is of minimal consequence.

In the embodiment of FIG. 1, having controls as in FIG. 6, actuator 58 operates work head 36 about its pivot under control of valve 130a, but a control loop operates the valve. The control loop includes a source of information comprising drum 120, sensing head 122a and storage register 126a. The control loop also includes a feedback portion involving A-D encoder 78 and coupling means 80, 82, 50, 48, etc., to work head 36. The digital values provided by register 126a and the A-D encoder are compared in unit 128a. All of this control apparatus provides a main control for work head 36 that responds to independent input information. Servoreceiver 98 introduces an offset between the indicated position of work head 36 represented in the a-D encoder. The offset is controlled by servotransmitter 88 that represents the positions or displacements of arm 16, 18 and thus the offset in the control of work head 36 is determined, indirectly, by the same source of information as that which determines the positions and angular motions of arm 16, 18.

In each form of control represented in FIGS. 3, 4 and 5, the offset modifies the position of the work head initially established by the main or independent control device. Both the encoder and the servo receiver have a common support in FIG. 3 where differential 90 is used. In FIG. 4, the frame of the A-D encoder (which normally is stationary and provides a reference) is mounted for movement by the servoreceiver. In FIG. 5, the servoreceiver is interposed between A-D encoder 78 and shaft 80. As noted earlier, each form of construction has its special advantages.

In FIG. 7 the same broad concept is followed, shifting work head 36 from its independent program control in which its initial position is established at the start of the parrallel-motion mode of operation. Thereafter the control of work head 36 is by the offset control system, locked inversely to the control and angular motion of arm 16, 18. There is no need for reset of the offset control to occur. When independent angular actuation of the work head is to resume, relay 154 is simply deenergized. Thereafter, sensing head 122a' becomes the sole source of control of the angular actuator of the work head. Angular motion of the work head proceeds on an incremental basis, the subsequent angular operation being measured from the position last assumed by the work head when the offset mode was in effect. In like sense, the reset feature of the apparatus in FIGS. 1—5 would become unnecessary were the advantageous absolute-coordinate system of controls in that apparatus (characterized by the inclusion of digital position encoders) to be replaced by various well-known incremental systems of program control. Moreover, while synchro-servosystems are shown in the apparatus of FIGS. 1—5 for providing the parallel-motion mode of operation, other forms of servo systems may be employed such as a self-balancing resistance bridge, for example. A self-balancing bridge used in a servosystem is shown, for example, in FIG. 7.

The foregoing description of illustrative applications of the several novel features of the invention are readily modified and variously applied by those skilled in the art. For example, while the automatic operation as described above is accomplished with the aid of magnetic recordings, other forms of program control media are contemplated, and the described program controls may be modified to include other sources of control information from a supplemental source, e.g., a computer, or a source of motion-coordinating signals as in the aforementioned application of Devol et al., filed concurrently herewith. Consequently the invention should be construed broadly, in accordance with its full spirit and scope.

I claim:

1. Apparatus for executing sequences of motions, including a work head and means for operating the work head in multiple degrees of freedom, said operating means including an arm supporting said work head for pivotal motion relative to said arm about a first axis, means supporting said arm for pivotal motion about a second axis spaced from but parallel to said first axis, actuators for operating said arm and said head about their respective pivotal axes, and a control system for causing said work head to retain a constant direction despite angular motions of said arm about its pivotal axis, the apparatus thereby operating in a parallel-motion mode, said control system including a control device for the angular actuator of said arm and control means for said work head pivoting actuator, and a source of control information for the control device of said angular arm actuator, said control system having means for deriving parallel-mode control information from said control information for said control means of the work head pivoting actuator, said control means of the work head actuator being responsive to the information deriving means and arranged to effect angular motions of the work head that are equal and opposite to the angular motions of said arm.

2. Apparatus in accordance with claim 1, further including means for actuating portions of said arm relative to each other for extending and retracting the work head in relation to the pivotal support means of the arm.

3. Apparatus in accordance with claim 1, further including means for actuating portions of said arm relative to each other for extending and retracting the work head in relation to the pivotal support means of the arm, and including further means for actuating said arm in another degree of freedom, so that said work head is operable in three-dimension paths involving angular motions of said arm, and so that said work head is adapted to maintain a constant angular attitude during such angular motions of the arm.

4. Apparatus in accordance with claim 1, wherein said source of control information for the control device of the arm angular actuator is utilized directly for controlling the control means of said pivotal actuator of the work head.

5. Apparatus in accordance with claim 1, wherein said means for deriving said control information includes a signal generating device responsive to the angular operation of said arm, said signal generating means being coupled to said control means of said pivotal actuator of the work head for providing an indirect coupling between the control means of said pivotal work head actuator and said source of control information for said arm actuator.

6. Apparatus in accordance with claim 1, wherein said control means includes a main control device for controlling the work head actuator to establish a basic angular orientation of said work head that is sustained during said parallel-motion mode of operation of the apparatus and an offset control device responsive to said derived control information.

7. Apparatus in accordance with claim 6, wherein said main control device is a digital encoder, and wherein said offset control device includes means operable for resetting the offset device to establish control of said work head actuator by said main control free of offset.

8. Apparatus in accordance with claim 1, wherein said control means for the actuator of the work head includes an offset control device for said head actuator, a main control device for establishing a basic angular orientation of said work head relative to said arm to be sustained during the parallel-motion mode of operation, and a differential for coupling together said offset control device and said main control device.

9. Apparatus in accordance with claim 8, wherein said main control device is a digital encoder, and wherein said offset control device includes means operable for resetting the offset device to establish control of said work head actuator by said main control free of offset.

10. Apparatus in accordance with claim 1, said control means for the angular actuator of the work head including a direct actuator control, a main control device for establishing a basic angular orientation of said work head to be sustained during the parallel-motion mode of operation, and an offset control device, said main control device including a shaft and a rotatably mounted frame coupled, respectively, to said offset actuator control and to said direct actuator control.

11. Apparatus in accordance with claim 10, wherein said main control device is a digital encoder, and wherein said offset control device includes means operable for resetting the offset device to establish control of said work head actuator by said main control free of offset.

12. Apparatus in accordance with claim 3, including program control means providing control information for coordinated three-dimensional operations of said apparatus, said program control means including the aforesaid source of control information for the control device of said angular actuator of said arm.

13. Apparatus in accordance with claim 3, including program control means providing control information for coordinated three-dimensional operations of said apparatus, said program control means including the aforesaid source of control information for the control device of said angular actuator of said arm, and a separate program for controlling pivotal operation of the work head, said control means of the work head actuator further including means for rendering said control means selectively responsive to said information deriving means.

14. Apparatus in accordance with claim 12, said program control means additionally providing an independent source of control information for said work head pivoting actuator control device, and program controlled means for selectively rendering said work head pivoting actuator control device responsive either to said source of control information of the angular arm actuator or to said independent source of control information.

15. Apparatus in accordance with claim 14, wherein said work head pivoting actuator control means includes a direct actuator control, a differential having a shaft coupling to said direct actuator control, a program controlled control device coupled to said differential and an offset control device separately coupled to said differential, said differential controlling said direct actuator control and said differential being effective to resolve the control provided by said program controlled control device and said offset control device.

16. Apparatus in accordance with claim 6, wherein said main control device is part of a feedback loop coupled to said work head pivoting actuator.

17. Apparatus for executing sequences of motions, including an arm supported for pivotal movement about a first axis, a work head pivotally supported on said arm at a second axis parallel to said first axis, a first actuator for operating said arm about said first axis, a second actuator for operating said work head about said second axis, and control apparatus for said actuators including first control means for said first actuator and a second control means for said second actuator for separately controlling the pivotal operation of said arm and of said work head relative to said arm, and respective channels of control information for said first control means and said second control means, said control apparatus also including parallel-motion control means selectively operable for effecting coordinated inverse angular operation of said arm and said work head so that the work head moves relative to said arm through angles that are equal and opposite to the angles of operation of the arm about its axis while said parallel-motion control means is in operation, said parallel-motion control means comprising means for rendering one of said control means inversely responsive to the control information of the other control means, said work head and said arm also being operable separately in response to their respective channels of control information.

18. Apparatus in accordance with claim 17, wherein said parallel-motion control means comprises a control signal generator operable coordinately with said arm, and wherein said second control means includes means responsive to the control signal generator for causing coordinated inverse control of said second actuator apart from any response of said second control means to its related channel of control signals.

19. Apparatus in accordance with claim 17, wherein the parallel-motion control means includes a control information generator operable by one of said actuators in accordance with the control information to the control means thereof and further includes means for subjecting the control means of the other of said actuators to control by said control information generator.

20. Apparatus for executing sequences of motions, including an arm supported for pivotal movement about a first axis, a work head pivotally supported on said arm at a second axis parallel to said first axis, a first actuator for operating said arm about said first axis, a second actuator for operating said work head about said second axis, and control apparatus for said actuators including first control means for said first actuator and a second control means for said second actuator for separately controlling the pivotal operation of said arm and of said work head relative to said arm, said control apparatus also including parallel-motion control means selectively operable for effecting coordinated inverse operation of said arm and said work head so that the work head moves relative to said arm through angles that are equal and opposite to the angles of operation of the arm about its axis while said parallel-motion control means is in operation, said work head and said arm also being operable separately in response to their respective control means, said parallel-motion control means comprising means operable coordinately with the operation of said arm control means to provide offset control output, and means for combining the output of said offset providing means with the control effect of said second control means so that the work head is angularly operable relative to the arm separately under control of said second control means and the work head is also operable in the parallel-motion mode when said second control means is maintained in a constant control condition.

21. Apparatus in accordance with claim 20, wherein said combining means includes a differential responsive separately to said second control means and to said offset control output. 30

22. Apparatus for executing sequences of motions, including an arm supported for pivotal movement about a first axis, a work head pivotally supported on said arm at a second axis parallel to said first axis, a first actuator for operating said arm about said first axis, a second for operating said work head about said second axis, and control apparatus for said actuators including first control means for said first actuator and a second control means for said second actuator for separately controlling the pivotal operation of said arm and of said work head relative to said arm, said control apparatus also including parallel-motion control means selectively operable for effecting coordinated inverse operation of said arm and said work head so that the work head moves relative to said arm through angles that are equal and opposite to the angles of operation of the arm about its axis while said parallel-motion control means is in operation, said work head and said arm also being operable separately in response to their respective control means, said first and second control means comprising respective digital control servos for said first and second actuators, and said parallel-motion control means including an offset system having an offset signal transmitter operable coordinately with said arm and an offset signal receiver responsive to said transmitter and arranged to introduce an inverse angular control into the control of the work-head digital servo over the work-head actuator.

23. Apparatus for effecting sequences of motions, including an arm having pivotal support means for operation about a first axis, a work head having pivotal support means on said arm for operation about a second pivotal axis parallel to said first axis, a first actuator for operating said arm about said first axis, a second actuator for operating said work head relative to said arm about said second axis, and control apparatus for said actuators, said control apparatus including first control means for said first actuator, second control means for said second actuator, an individual channel of control information, and means rendering both said first control means and said second control means responsive to said individual channel of control information so as to cause said first actuator to effect angular motion of said arm about said first axis in accordance with the control information from said individual channel and coordinately to effect equal but opposite angular motion of said work head relative to said arm about said second axis in accordance with the same control information from said individual channel, whereby the direction of said work head is maintained constant during angular motions of said arm.

24. Apparatus in accordance with claim 23, wherein said last-named means includes means operable by one of said actuators in response to the control information from said individual channel to derive control input therefrom and means for applying the derived control input to the control means of the other of said actuators.